United States Patent [19]
Stephens

[11] Patent Number: 5,964,502
[45] Date of Patent: Oct. 12, 1999

[54] HIGH-BACK CHILD RESTRAINT SYSTEM

[75] Inventor: William B. Stephens, Boulder, Colo.

[73] Assignee: Evenflo Company, Inc., Vandalia, Ohio

[21] Appl. No.: 08/736,971

[22] Filed: Oct. 25, 1996

[51] Int. Cl.$^6$ ................................................ B60N 2/26
[52] U.S. Cl. .................. 297/250.1; 297/484; 297/256.13
[58] Field of Search ..................... 297/250.1, 256.13, 297/363, 364, 188.01, 484, 473, 483

[56] References Cited

U.S. PATENT DOCUMENTS

| | | | |
|---|---|---|---|
| D. 315,453 | 3/1991 | Takada | D6/333 |
| D. 325,132 | 4/1992 | Cone | D6/333 |
| D. 338,343 | 8/1993 | Grange | D6/333 |
| D. 353,057 | 12/1994 | Koyanagi et al. | D6/333 |
| D. 355,986 | 3/1995 | Myers | D6/356 |
| D. 361,743 | 8/1995 | Matsumoto et al. | D12/129 |
| D. 369,911 | 5/1996 | Turner | D6/333 |
| 3,709,558 | 1/1973 | Jakob | 297/250 |
| 3,910,634 | 10/1975 | Morris | 297/384 |
| 4,205,877 | 6/1980 | Ettridge | 297/321 |
| 4,274,674 | 6/1981 | Deloustal | 297/363 X |
| 4,613,188 | 9/1986 | Tsuge et al. | 297/250 |
| 4,616,878 | 10/1986 | Fohl | 297/483 |
| 4,685,741 | 8/1987 | Tusge et al. | 297/467 |
| 4,687,255 | 8/1987 | Klanner et al. | 297/488 |
| 4,761,860 | 8/1988 | Krauss | 24/142 |
| 4,786,081 | 11/1988 | Schmidt | 280/808 |
| 4,834,420 | 5/1989 | Sankrithi et al. | 280/728 |
| 4,872,704 | 10/1989 | Biller et al. | 280/808 |
| 4,880,277 | 11/1989 | Takahashi et al. | 297/467 |
| 4,979,777 | 12/1990 | Takada | 297/250 |
| 4,984,845 | 1/1991 | Knoedler et al. | 297/487 |
| 4,998,307 | 3/1991 | Cone | 5/94 |
| 5,031,962 | 7/1991 | Lee | 297/484 |
| 5,050,907 | 9/1991 | Boumarafi et al. | 280/808 |
| 5,052,750 | 10/1991 | Takahashi et al. | 297/256.13 |
| 5,061,012 | 10/1991 | Parker et al. | 297/467 |
| 5,098,161 | 3/1992 | Minami et al. | 297/250.1 X |
| 5,110,182 | 5/1992 | Beauvais | 297/256.13 X |
| 5,125,717 | 6/1992 | Skold et al. | 297/250 |
| 5,158,337 | 10/1992 | Leggett | 297/250 |
| 5,207,478 | 5/1993 | Freese et al. | 297/296 |
| 5,228,745 | 7/1993 | Hazel | 297/229 |
| 5,230,523 | 7/1993 | Wilhelm | 280/30 |
| 5,236,221 | 8/1993 | Minami | 280/806 |
| 5,265,908 | 11/1993 | Verellen et al. | 280/801 A |
| 5,303,979 | 4/1994 | Koyanagi et al. | 297/250.1 |
| 5,322,343 | 6/1994 | Parker et al. | 297/183 |

(List continued on next page.)

FOREIGN PATENT DOCUMENTS 609 890 A1   2/1994   European Pat. Off. ......... B60N 2/28

OTHER PUBLICATIONS

Sicartex brochure, date unknown, in German (not translated).

*Primary Examiner*—Peter M. Cuomo
*Assistant Examiner*—Stephen Vu
*Attorney, Agent, or Firm*—Robert G. Crouch; Holland & Hart LLP

[57] ABSTRACT

A child restraint system including a seat back pivotably connected to a seat bottom and having a fabric cover thereon. The seat back includes two oblong openings defined therein which are covered by mesh portions provided on the fabric cover to allow for the improved flow of air between the area behind and to the side of the seat back and the area in the vicinity of the torso of the child occupying the child restraint system and to allow for the easy connection of the child restraint system to the seat of the motor vehicle. A guide providing multiple possible positions for a shoulder belt of the motor vehicle seat belt system is provided on the seat back. The guide may be fixed with a plurality of fixed channels thereon for receiving and retaining the shoulder belt or the guide may be movable relative to the seat back, being yieldingly held in place by a spring and a pattern of serrations defined on the guide. The tiltable connection of the seat back to the seat bottom is accomplished by a pivot pin received within each of the seat back and the seat bottom. A locking member is selectively receivable within bores defined in the seat back and the seat bottom to prevent further pivotable movement.

9 Claims, 7 Drawing Sheets

U.S. PATENT DOCUMENTS

| | | | |
|---|---|---|---|
| 5,356,107 | 10/1994 | Sinohuiz | 297/188.01 X |
| 5,366,271 | 11/1994 | Johnston et al. | 297/250.1 |
| 5,370,441 | 12/1994 | Chuang | 297/250.1 |
| 5,413,401 | 5/1995 | Koyanagi | 297/250.1 |
| 5,458,398 | 10/1995 | Meeker et al. | 297/250.1 |
| 5,462,333 | 10/1995 | Beauvais | 297/216.11 |
| 5,466,044 | 11/1995 | Barley et al. | 297/252 |
| 5,468,046 | 11/1995 | Weber et al. | 297/484 X |
| 5,487,588 | 1/1996 | Burleigh et al. | 297/253 |
| 5,527,094 | 6/1996 | Hiramatsu et al. | 297/250.1 |
| 5,551,751 | 9/1996 | Sedlack et al. | 297/256.13 |
| 5,582,458 | 12/1996 | Wildt | 297/188.01 X |

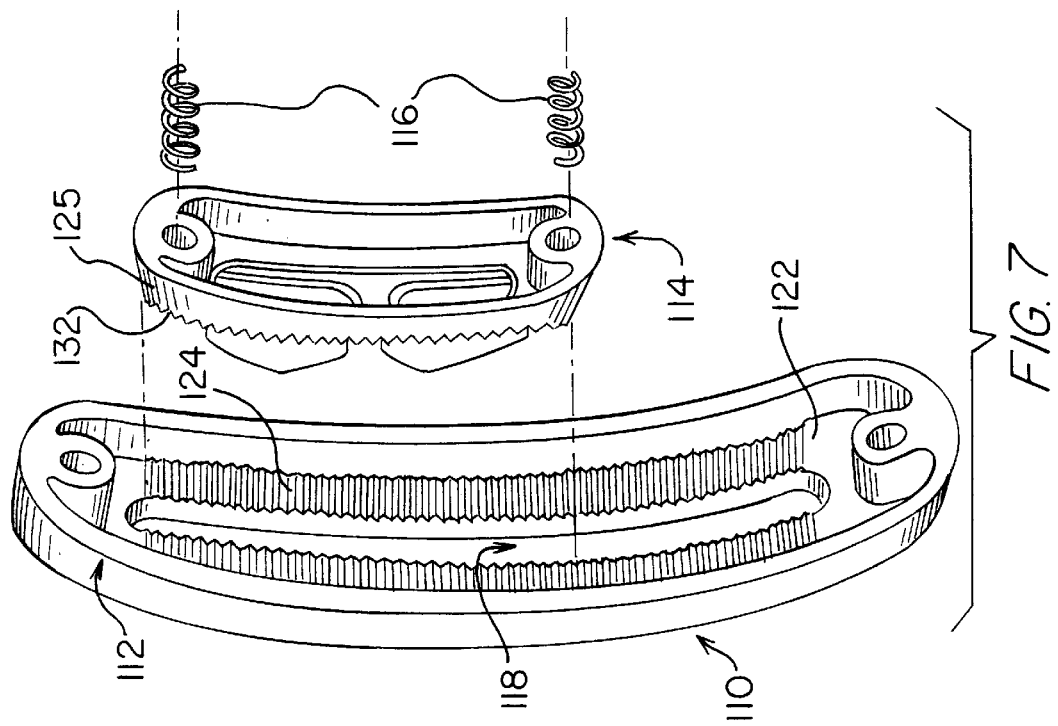
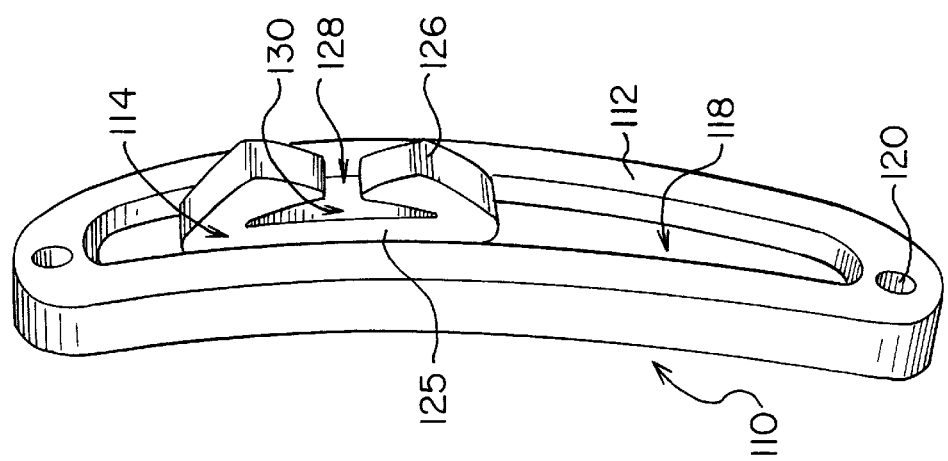
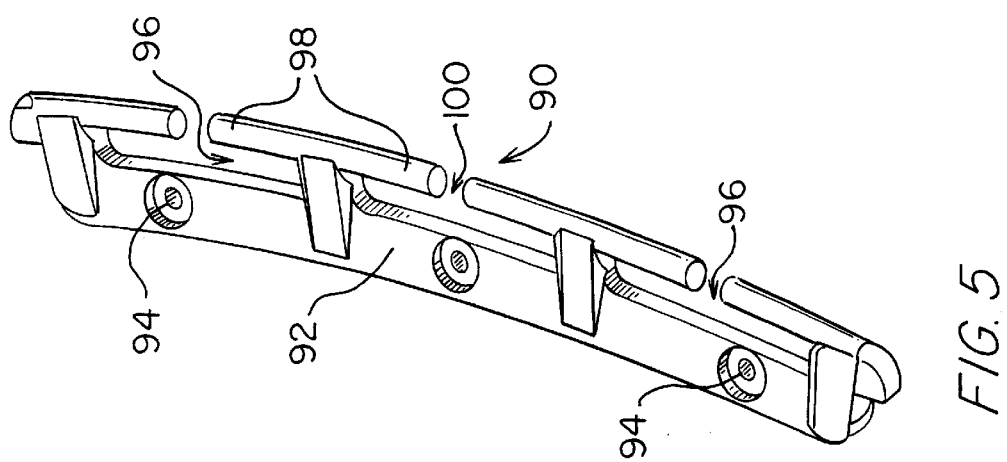

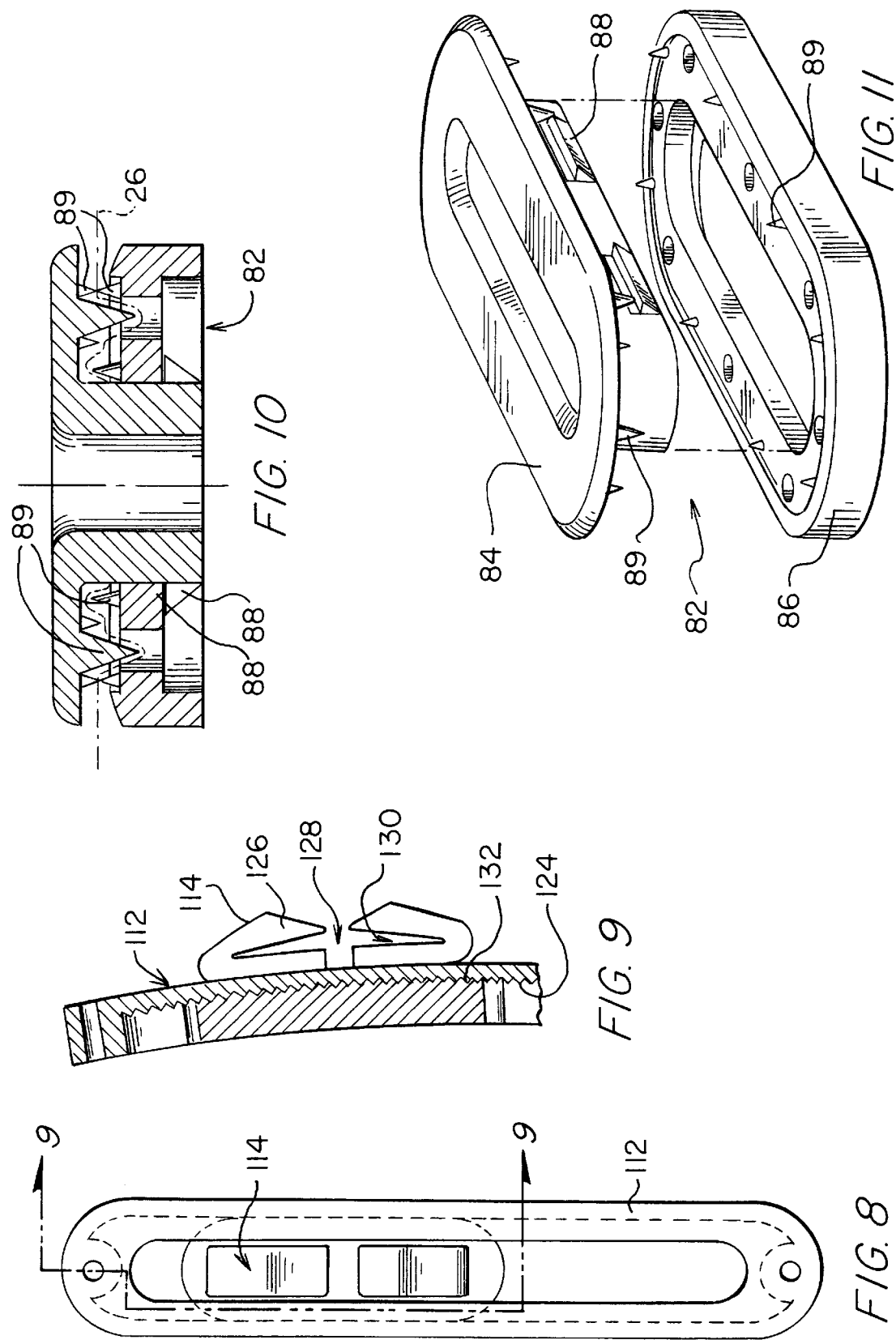

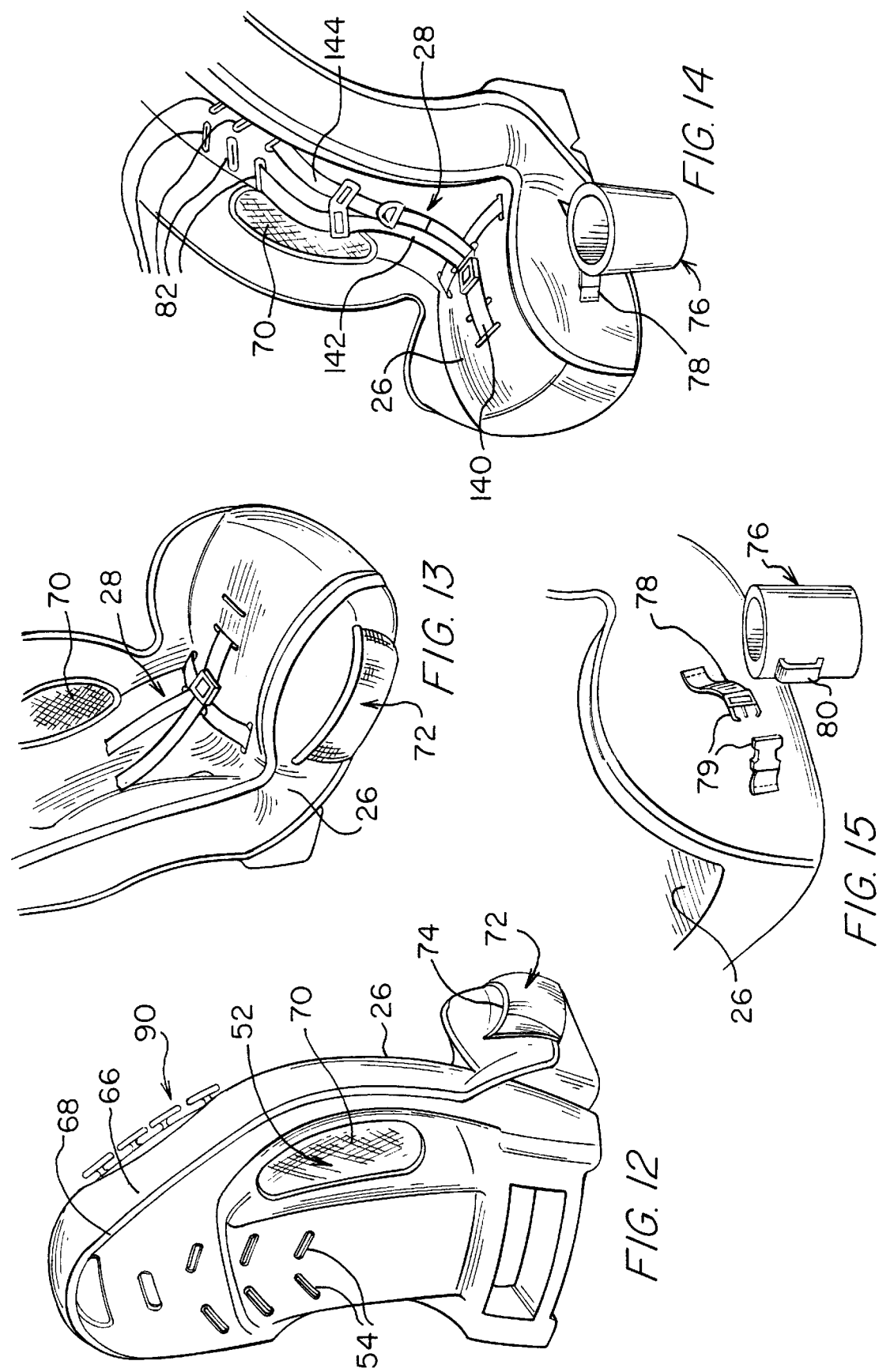

HIGH-BACK CHILD RESTRAINT SYSTEM

The represent invention relates to an improved design for a child restraint system for use in motor vehicles and, more particularly, to a child restraint system which has an improved ability to tilt, improved adjustability of the child restraint belts in the child restraint system, improved positioning of the shoulder belt of the motor vehicle relative to the occupant of the child restraint system, and other improved comfort and convenience features.

BACKGROUND OF THE INVENTION

Most child restraint systems, commonly referred to as car seats, include an integrally-formed shell member which provides a seat bottom and seat back. To provide an ability to tilt such child restraint systems, either to more closely fit the tilted nature of the motor vehicle seat or to place the child in an orientation which is more conducive to sleep, it is typical to provide a pivotable brace extending from the bottom of the shell of the child restraint system. The brace can be pivoted so as to raise the front end of the shell and thus effectively tilt the entire child restraint system. Most child restraint systems do not provide for pivoting between the seat bottom and seat back of the child restraint system.

A few designs, however, do provide for such pivoting. One design has a pivotable connection between the seat bottom and the seat back which is primarily provided to allow the seat back to be pivoted backward into a position where the back of the seat back rests against the bottom of the seat bottom in order to entirely collapse the child restraint system for easy carriage of the restraint system on and off commercial aircraft. In that design, only a limited amount of forward pivoting is available (which is provided primarily to meet safety standards for child restrain systems in aircraft). In addition, there is no provision to lock the seat back in any particular pivotable position relative to the seat bottom. Instead, the seat back can naturally assume the given tilt angle of the aircraft seat.

Another design does provide for pivotable movement between the seat bottom and seat back of a child restraint system. In that design, a pivotable hinged connection is supplemented with a threaded bolt and clamping nut which are received in an arcuate slot formed at the bottom end of the seat back. Thus, the clamping nut can be tightened to hold the seat back at any of the pivotable positions relative to the seat bottom as permitted by the arcuate slot. This design has the obvious disadvantage that the bolt and clamping nut arrangement are not convenient to use and may be subject to slippage if not tightened properly, since it is a frictional force which holds the seat back in position.

Many child restraint systems are designed to operate in either of two modes. In a first mode, for younger children, the seat belt of the motor vehicle is threaded through a portion of the child restraint system and secured to the motor vehicle. Child restraint belts within the child restraint system are provided to restrain the child therein. Typically, such arrangements are either three-point or five-point attachment systems. In a second mode, for older children, the child restraint belts of the child restraint system are not employed, and the seat belts of the motor vehicle are extended across the front of the occupant of the child restraint system to hold the child and the child restraint system in place.

Such systems present several issues. First, in the first mode described above, the child restraint belts of the child restraint system are typically manually adjusted to provide for the proper belt length depending on the size of the child. As the child grows, or as different children use the same child restraint system, it is necessary to readjust the length of the belts. This is typically performed by manipulating belts and buckles on the back of the child restraint system. Another difficulty presented by many designs is that it is difficult to thread the motor vehicle seat belt through the back, bottom, or inner passageways of the child restraint system.

Another issue relating to such child restraint systems is the positioning of the motor vehicle's shoulder belt in the second mode described above. Optimally, the shoulder belt crosses the occupant of the seat at a central point between the tip of the shoulder and the neck of the occupant. Higher positions are too close to the neck for safety concerns while lower positions are too low and do not sufficiently restrain the upper body of the occupant.

Another issue with most child restraint systems is comfort. Typically, the child restraint system is formed and conformed in a shape which at least partially surrounds the body of the occupant. While this may be preferred from a safety perspective, it decreases the amount of fresh air which flows across and surrounds the occupant. For this reason, child restraint systems are often hot, stuffy, and uncomfortable to the occupant.

Lastly, occupants and owners of child restraint systems have need to store books, play things, etc. nearby the child restraint system for the amusement and entertainment of the occupant. In addition, it is desirable from time to time to provide a secure device for holding a container of a beverage which the occupant may be consuming.

It is against this background and the desire to solve the problems of the prior art that the present invention has been developed.

SUMMARY OF THE INVENTION

Accordingly, it is an object of the present invention to provide a child restraint system which has a seat back which is easily and conveniently tilted relative to the seat bottom.

It is also an object of the present invention to provide child restraint belts within a child restraint system which are easily and conveniently adjustable to different sizes.

It is another object of the present invention to provide a child restraint system with a means for selectively and accurately positioning the shoulder belt of the motor vehicle relative to the occupant of the child restraint system.

It is further an object of the present invention to provide a child restraint system which is more comfortable to the occupant, including increasing the flow of fresh air to the occupant's body.

It is still further an object of the present invention to provide a child restraint system with convenient storage containers for various and sundry items, including beverages.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a child restraint system for boosting a child up from the seat of a motor vehicle, the system and the child being secured in the seat by a seat belt system in the motor vehicle which includes a shoulder belt. The child restraint system includes a seat platform and a back platform attached to the seat platform, the back platform having sides thereon. The system also includes a belt guide attached to one side of the back platform, the belt guide defining an open channel therein for removably receiving the shoulder belt of the motor vehicle seat belt system, the shoulder belt being slidable within the channel, the belt guide providing multiple locations for positioning the shoulder belt so that the shoulder belt can be positioned at a central point between the child's neck and the shoulder.

The belt guide may be fixedly attached to the side of the back platform, the belt guide including a plurality of fixed open channels defined therein. Each fixed open channel may include a bottom, two side walls, and two portions of a top, each portion of the top being attached to opposite ones of the side walls to define a gap between the two top portions, wherein the shoulder belt is insertable into and removable from the belt guide through the gap, the top portions serving to retain the shoulder belt in the belt guide until the shoulder belt is threaded through the gap. The belt guide may be slidably attached to the side of the back platform, and further may include a retaining device associated with the back platform to yieldingly retain the belt guide in one of the multiple locations. The belt guide may include serrations formed thereon, and wherein the retaining device may include corresponding mating serrations formed thereon and the belt guide is yieldingly held against the retaining device to prevent slidable movement therebetween when held thereagainst. The belt guide may be yieldingly held against the retaining device by a spring, wherein the belt guide can be forced by an operator against the resilient force of the spring to move the serrations of the belt guide away from the serrations of the retaining device and then the belt guide can be slid to a new position relative to the retaining device and back platform, the spring forcing the serrations of the belt guide toward the serrations of the retaining device when the operator ceases to provide a sufficient force against the resilient force of the spring. The child restraint system may include two belt guides, one attached to each of the two sides of the back platform.

The present invention is also directed to a child restraint system for restraining a child including a platform base providing structural support to the child restraint system, the platform base having at least one large opening defined therein in an area proximate to the child's torso. The system also includes a fabric cover disposed on top of the platform base and suitable for sitting on by the child, the fabric cover including at least one mesh portion aligned with and corresponding to each of the at least one opening defined in the platform base, to allow for the increased circulation of air to and from the vicinity surrounding the child's trunk.

The platform base may include two of the openings, one formed on each of the lateral sides thereof corresponding to the lateral sides of the child's trunk. The opening may cover an area greater than ten square inches.

The present invention is also directed to a child restraint system including a seat having a seat portion and a back portion, and a mesh pocket attached to the seat to receive various sundry items. The mesh pocket may be removably attached to the seat.

The present invention is also directed to a child restraint system including a seat having a seat portion and a back portion, and a beverage container holder attached to the seat. The beverage container holder may be removably attached to the seat. The beverage container holder may be formed from an insulting material.

The present invention is also directed to a child restraint system including a seat platform and a back platform pivotably attached to the seat platform at a pivot point, the back platform being selectively attachable at a plurality of fixed positions to the seat platform by a locking member which is received within a bore defined on one of the seat platform and back platform and which is selectively received within one of a plurality of bores defined on the other of the seat platform and back platform, the plurality of bores being located on an arcuate line.

The present invention is also directed to a child restraint system for restraining a child including a platform base providing structural support to the child restraint system and a seat belt system cooperating with the platform base to restrain the child in the child restraint system. The system also includes a fabric cover disposed on top of the platform base and suitable for sitting on by the child, the fabric cover having openings defined therein for passage therethrough of portions of the seat belt system. Further, the system includes a two-part grommet attached to the fabric cover and surrounding at least one of the openings, the two-part grommet including two separate mating portions which are attachable together from opposite sides of the fabric cover to mate thereto.

The present invention is also directed to a child restraint system including a platform base and a child restraint belt system in which the child is restrained within the child restraint system by belts attached to the platform base at three attachment points, the belts being linked to each other in a continuous strip so that excess slack can be removed from any of the belts to remove slack from the other belts, the belt system further including a mid-belt adjuster located on one of the belts for adjusting the slack in the entire belt system. The belt system may be attached to the platform base at five attachment points.

The present invention is also directed to a child restraint system for restraining a child, including a platform base providing structural support to the child restraint system and a seat belt system cooperating with the platform base to restrain the child in the child restraint system, the seat belt system including a crotch belt connectable to a main belt which loops over each shoulder and thigh of the child, wherein the main belt may include a mid-belt adjuster thereon in a position disposed in front of the child when sitting in the child restraint system for adjusting the length of the main belt.

The main belt may be connected at opposite ends to the platform base behind the shoulders of the child and the main belt runs from behind each of the child's shoulders to the connection with the crotch belt to a loop around the child's thighs which loop also loops around at least a portion of the platform base.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings

FIG. 5 is a perspective view of a shoulder belt guide of the present invention;

FIG. 6 is a perspective view of a second embodiment of a shoulder belt guide of the present invention;

FIG. 7 is an exploded perspective view of the shoulder belt guide of FIG. 6;

FIG. 8 is a front view of the shoulder belt guide of FIG. 6;

FIG. 9 is a cross-sectional view taken substantially along lines 9—9 of FIG. 8;

FIG. 10 is a cross-sectional view of a two-part belt grommet of the present invention;

FIG. 11 is an exploded view of the two-piece belt grommet of FIG. 10;

FIG. 12 is a rear perspective view of the child restraint system of FIG. 1, shown with the fabric cover in place, and illustrating a mesh fabric corresponding to a large opening in the seat back, and a side mesh pocket for storing various and sundry items;

FIG. 13 is a front, fragmentary perspective view of the child restraint system of FIG. 12;

FIG. 14 is a fragmentary perspective view of an opposite side of the child restraint system from FIG. 12, showing the attachment of an insulated beverage container holder;

FIG. 15 is an enlarged view of the holder of FIG. 14;

DETAILED DESCRIPTION OF THE PREFERRED EMBODIMENTS

Figure 1:
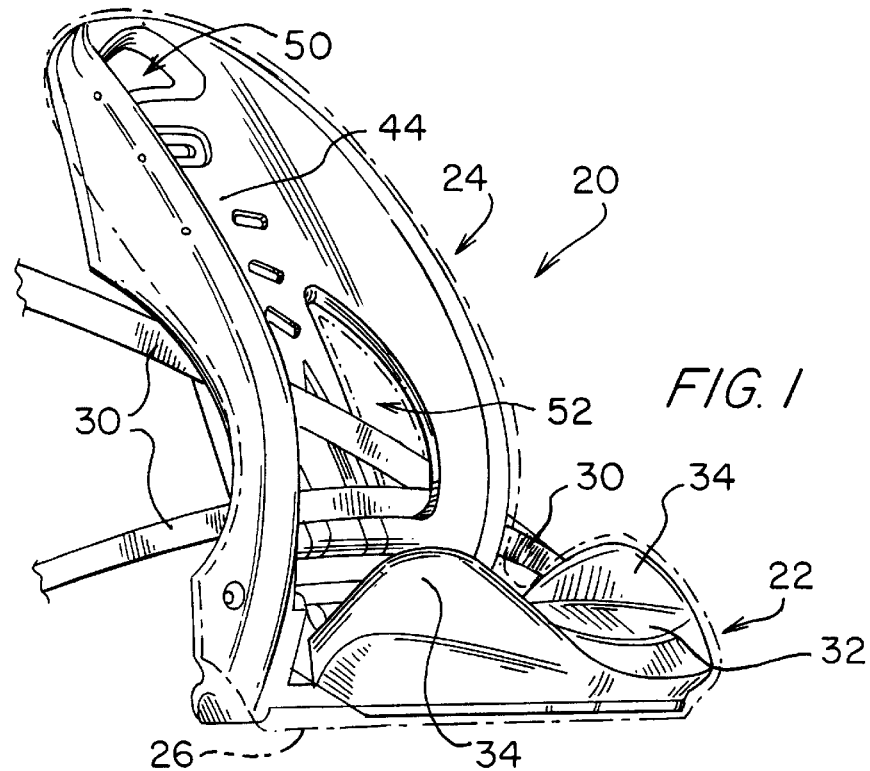
FIG. 1 is a perspective view of a child restraint system of the present invention, showing the fabric covering of the child restraint system in phantom, with a child restraint belt system of Child restraint system removed for illustration.

A high-back child restraint system 20 includes a seat bottom 22, a seat back 24, and a fabric cover 26 which covers both the seat bottom 22 and the seat back 24. The child restraint system 20 is preferably used in one of two modes. First, for younger children who require the use of a child restraint system, the present invention can be employed to restrain the child (not shown) in the restraint system 20 with a child restraint belt system 28 which is provided on the restraint system 20. When used in this mode, the child restraint system 20 itself is fastened to the motor vehicle seat by the seat belt 30 of the motor vehicle, as shown in FIG. 1. In a second mode, which is intended for relatively older children who do not necessarily require a child restraint system, the child restraint system 20 of the present invention acts as a booster to raise the child off of the seat of the motor vehicle to be able to better see out of the motor vehicle and to more optimally position the shoulder belt of the motor vehicle seat belt system 30 relative to the occupant.

Figure 2:
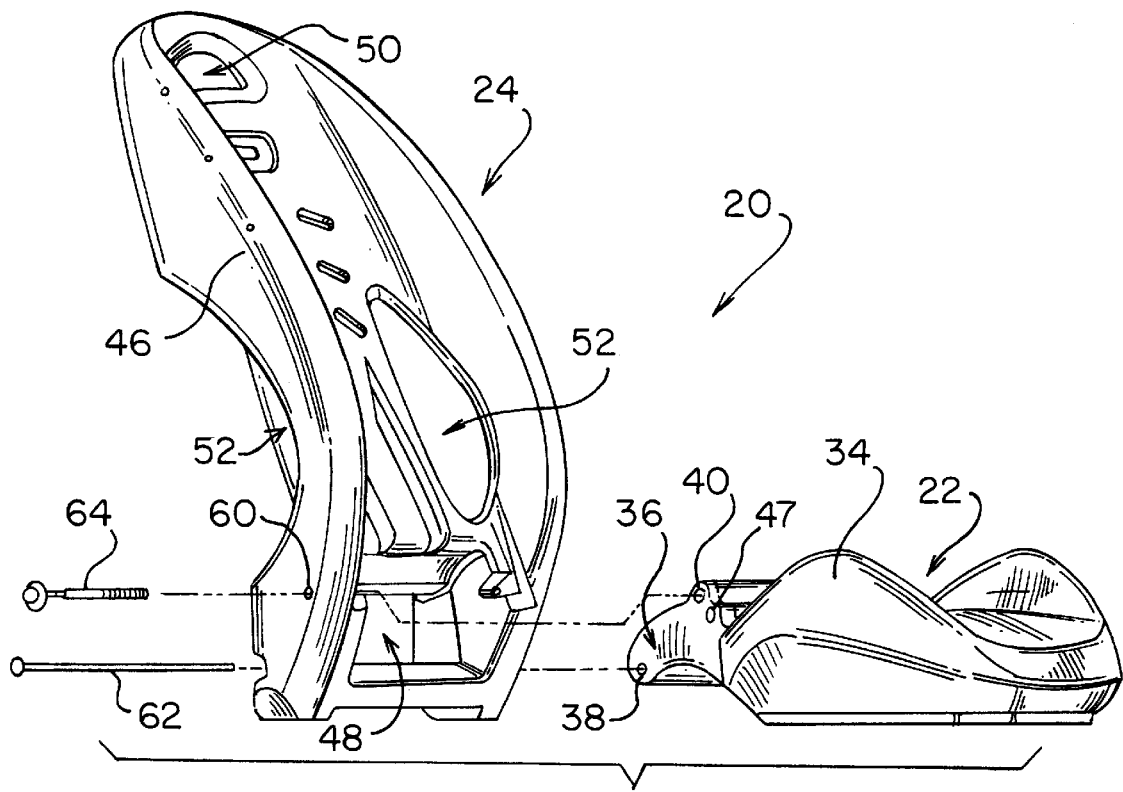
FIG. 2 is an exploded view of the child restraint system of FIG. 1.

The seat bottom 22, shown in FIGS. 1 and 2, is preferably formed in a conforming shape from plastic material, such as polyethylene. The seat bottom 22 includes a padded region 32 on the top surface thereof between conforming sides 34. Formed on a back end of the seat bottom 22 is a protruding neck 36 for connection to the seat back 24 as is explained in more detail below. Defined on the protruding neck 36 is a first bore 38 for pivotable connection to the seat back 24. Also defined on the protruding neck 36 are second and third bores 40 and 42 to selectively be used for locking engagement with the seat back 24. The second and third bores 40 and 42 are located on an arcuate line relative to the first bore 38.

Figure 4:
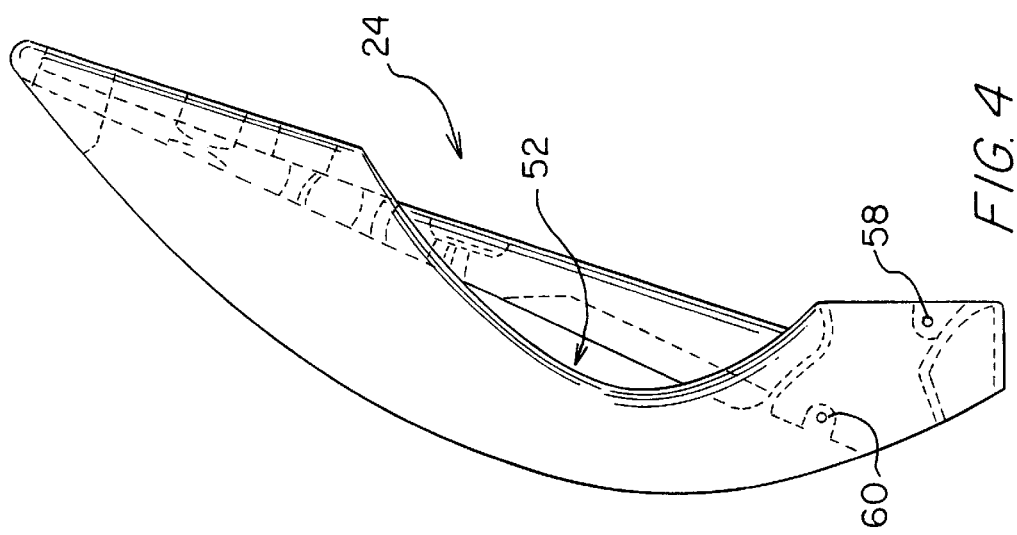
FIG. 4 is a side view of the seat back of FIG. 3.
Figure 3:
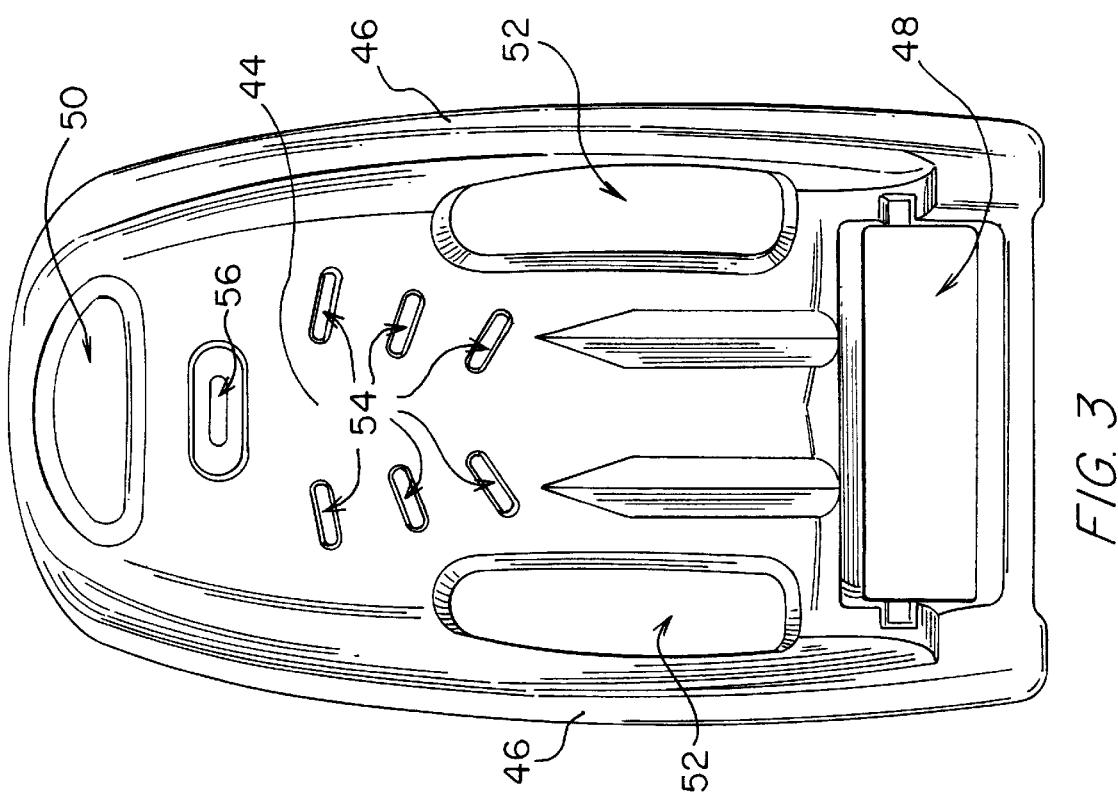
FIG. 3 is a front view of a seat back of the child restraint system of FIG. 1.

The seat back 24, best seen in FIGS. 3 and 4, includes a central region 44 which is substantially planar and which serves to support the back of the child. Formed on either lateral sides of the central region 44 are a pair of conforming sides 46 of the seat back 24. A plurality of openings are defined in the seat back 24 for various purposes. Generally, all of the openings serve to reduce the overall weight of the child restraint system 20, while at the same time maintaining the necessary structural integrity of the child restraint system 20. A generally rectangular opening 48 is defined at the lower end of the central region 44 to receive the protruding neck 36 of the seat bottom 22. A generally semi-circular opening 50 is defined near an upper end of the central region 44 to provide a convenient hand hold for carrying the child restraint system 20 when not installed in a motor vehicle. Defined between the upper and lower ends of the central region are a pair of oblong openings 52 which are partially defined in the central region 44 and partially defined in the conforming sides 46. These oblong openings 52 are quite large and may measure approximately nine inches long by three inches wide, thereby covering an area of approximately twenty-seven square inches. The oblong openings 52 provide a convenient and wide passageway for threading the motor vehicle seat belt 30 through the child restraint system 20 when operating in the first mode discussed above, as is illustrated in FIG. 1. Also defined in the central region 44 near the upper ends of the oblong openings 52 and located therebetween are a series of pairs of shoulder belt openings 54. Located between the series of shoulder belt openings 54 and the semi-circular opening 50 is an oval opening 56 which can receive an optional tether (not shown) as an additional means for attaching the child restraint system 20 to the motor vehicle. Defined in the conforming sides 46 on lateral sides of the rectangular opening 48 are first and second bores 58 and 60 for connection to the seat bottom 22.

Figure 17:
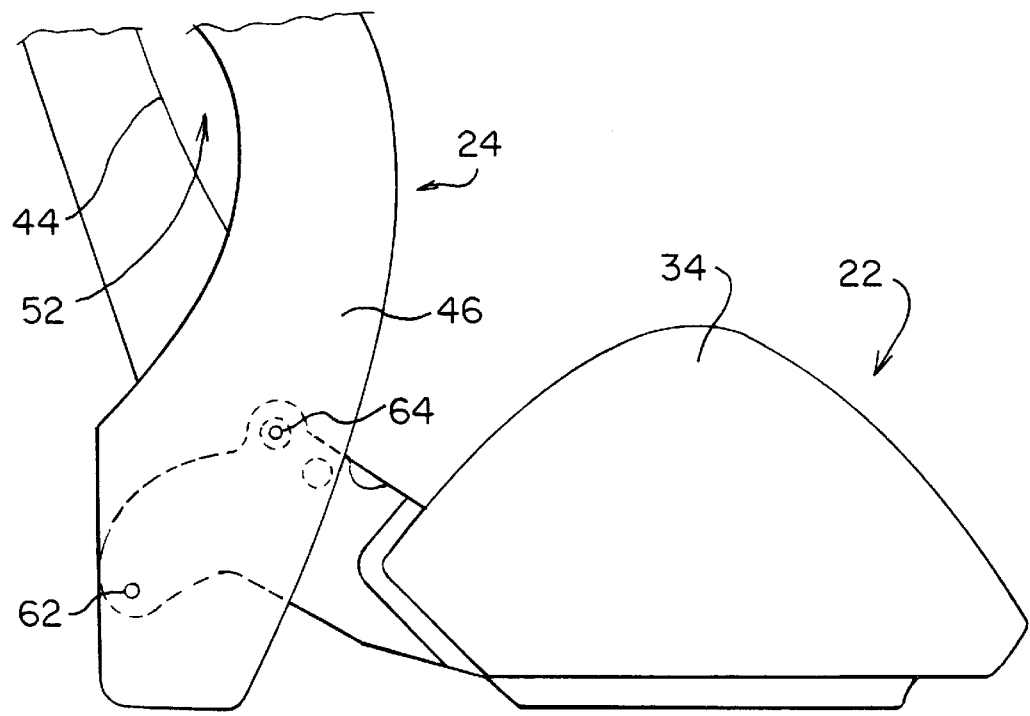
FIG. 17 is a fragmentary side view of the child restraint system of FIG. 1, showing the seat back in a reclined position.
Figure 16:
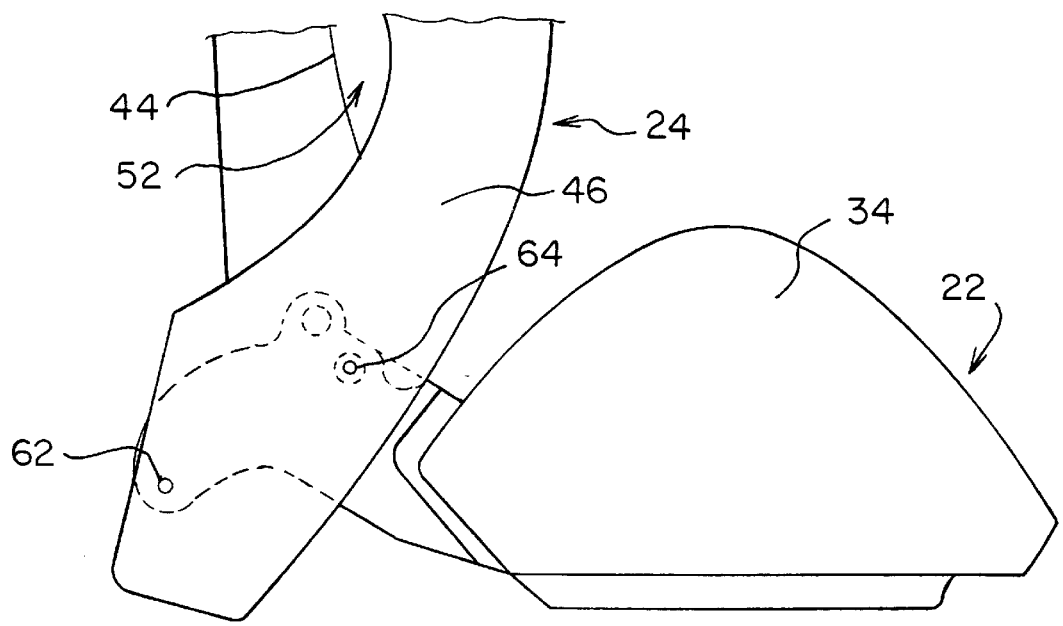
FIG. 16 is a fragmentary side view of the child restraint system of FIG. 1, showing the seat back in an upright position.

As seen best in FIGS. 2, 4, 16, and 17, with the protruding neck 36 of the seat bottom 22 inserted into the rectangular opening 48 of the seat back 24, a pivot pin 62 can be slidably inserted into the first bore 58 on either side of the seat back 24 and the first bore 38 of the seat bottom 22. With the pivot pin 62 fully installed and providing a pivot point, the seat back 24 is pivotably connected to the seat bottom 22. As can be appreciated, the seat back 24 is pivotable through a variety of positions relative to the seat bottom 22 and can be affixed to the seat bottom 22 at two different positions, an upright position (FIG. 16) and a reclined position (FIG. 17). A locking member or pin 64 is inserted into the second bore 60 of the seat back on one side thereof and received within either the second bore 40 or the third bore 42 of the seat bottom 22. Use of the second bore 40 provides the reclined position (FIG. 17) while use of the third bore 42 provides the upright position (FIG. 16). Optionally, a pair of locking pins 64 could be used to lock the seat back 24 to the seat bottom 22, one on each side of the child restraint system.

The fabric cover 26 is preferably composed of a suitable material for direct contact with the skin and clothing of the child. For example, this may be polycotton or flocked cotton. Furthermore, the fabric cover 26 may be padded. The fabric cover 26 is formed to cover both the seat bottom 22 and seat back 24 when assembled together as described above. The outer edges 66 of the fabric cover 26 are provided with an elastic material to yieldingly hold the fabric cover 26 onto the seat bottom 22 and seat back 24. The fabric cover 26 includes a plurality of openings defined therein to receive portions of the child restraint belt system 28. As shown in FIGS. 12 and 13, the fabric cover 26 includes a pair of mesh regions 70 which are located on a portion of the fabric cover 26 to correspond to and align with the oblong openings 52 defined in the seat back 24. As can be appreciated, the combination of the mesh regions 70 and the oblong openings 52 allows the easy flow of air between the area behind and to the side of the seat back 24 and the area in the vicinity of the child's torso or trunk when seated in the child restraint system 20.

For the sake of convenience, a mesh pocket 72 is provided on a right side of the fabric cover 26 in a region which corresponds with the outer portion of one of the conforming sides 34 of the seat bottom 22. The mesh pocket 72 is stitched to the fabric cover 26 along side and bottom edges thereof and provided with an elastic material 74 along a top edge thereof to yieldingly hold the pocket in a closed position. On the left side of the fabric cover 26, an insulated beverage container holder 76 (FIGS. 14 and 15) is selectively attachable to a horizontal strap 78 with a buckle 79 thereon at a position on the fabric cover 26 corresponding to the opposite conforming side 34 from the mesh pocket 72. The insulated beverage container holder 76 is provided with a vertically-oriented belt loop 80 which is slidably received on the strap 78 for attachment to the fabric cover 26.

A plurality of belt grommets 82 are provided, one for each of the openings on the fabric cover 26 which correspond to the series of shoulder belt openings 54 in the seat back 24, as shown in FIGS. 10, 11, and 14. Each belt grommet 82 includes two mating portions 84 and 86 thereof composed of polypropylene which can be mated together from opposite sides of the fabric cover 26 to attach thereto, to provide a firm surface for the belts to pass through as opposed to a button hole. Each mating portion 84 and 86 includes mating features 88 formed thereon as well as protruding fingers 89 for grasping the fabric of the fabric cover 26.

Figure 18:
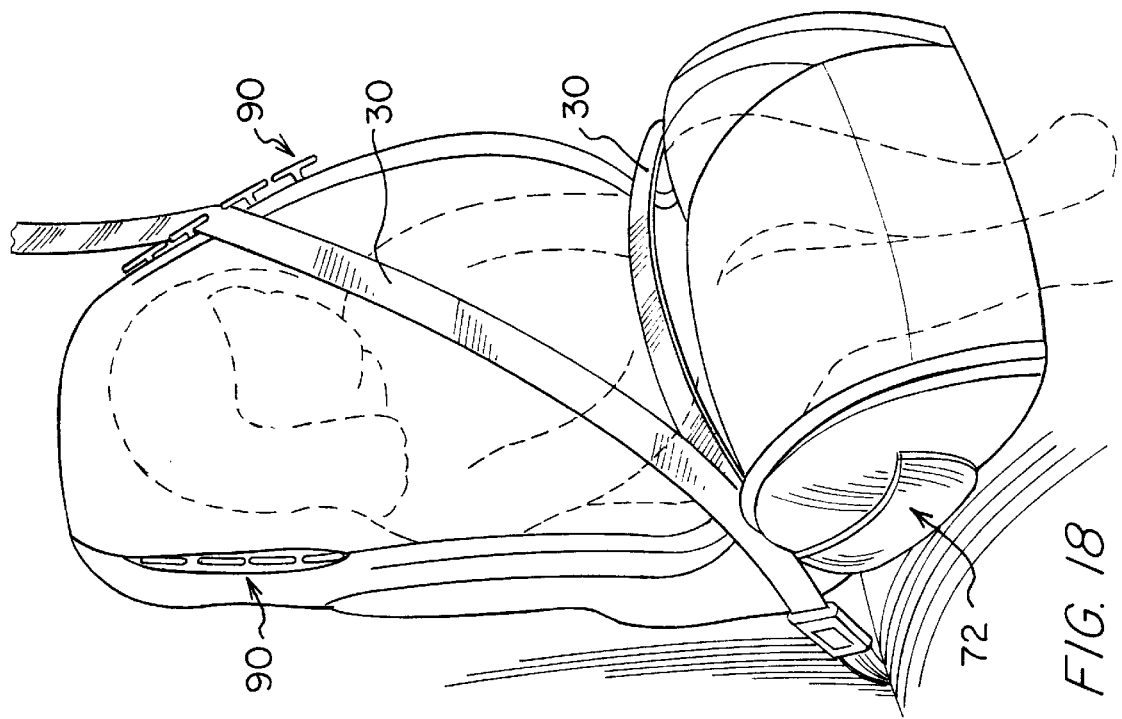
FIG. 18 is a perspective view of the child restraint system of the present invention, showing a child in phantom restrained in the system by a motor vehicle seat belt.

A shoulder belt guide 90 is shown in FIGS. 5, 12 and 18. The shoulder belt guide 90 is attached by rivets through the fabric cover 26 to one of the conforming sides 46 of the seat back 24. An identical shoulder belt guide is provided on the opposite conforming side of the seat back 24. The shoulder belt guide 90 includes a base portion 92 with openings defined therein for attachment to the seat back 24. Three separate channels 96 are defined in the shoulder belt guide 90 by a plurality of fingers 98 which extend parallel to and offset from the base portion 92. Preferably, the entire shoulder belt guide 90 is integrally formed from PVC material. The length of the fingers 98 is sufficient to define small gaps 100 therebetween for access in and out of the channels 96. The gaps 100 are sufficiently small so that once a seat belt is threaded through the gap and placed in the channel 96, the seat belt is not easily removed from the channel without rethreading it through the gap 100.

As can be appreciated, with the shoulder belt guide 90 located on the seat back 24, the motor vehicle seat belt 30 may be placed around the child restraint system 20 and occupant therein and fastened to the mating fastener of the seat belt system in the motor vehicle. The shoulder belt 30 of the motor vehicle can be positioned in the particular channel 96 which best places the shoulder belt 30 in the optimal position relative to the child. Preferably, this position is at a mid-point between the tip of the child's shoulder and the neck of the child.

A second embodiment of a shoulder belt guide 110 is shown in FIGS. 6–9. This shoulder belt guide 110 is easily and conveniently repositionable to a variety of positions thereon. The shoulder belt guide 110 includes a base portion 112, a movable channel structure 114, and a pair of springs 116 to bias the channel structure 114 toward the base portion 112, all as is best shown in FIG. 7. The base portion 112 is elongated and includes a longitudinal slot 118 defined therein. A pair of openings 120 are defined at opposite ends of the base portion 112 for attachment to the seat back 24. Defined on an underside 122 of the base portion 112 on opposite lateral sides of the slot 118 is a pattern of teeth or serrations 124.

The channel structure 114 includes a base 125 thereon from which a pair of opposed fingers 126 extend which form a gap 128 therebetween and which form a channel 130 underneath the fingers 126. Defined on an outer surface of the base 125 of the channel structure 114 is a pattern of teeth or serrations 132 which are sized to mate and be selectively engageable with the serrations 124 of the base portion 112.

When the base portion 112 of the shoulder belt guide 110 is attached to the seat back 24, the channel structure 114 and springs 116 can be received therebehind, with the fingers 126 of the channel structure protruding through the slot 118 formed in the base portion 112. With the springs 116 located between the seat back 24 and the channel structure 114, the channel structure 114 will be biased toward the base portion 112 so that the serrations 132 of the channel structure 114 mate and engage with the serrations 124 of the base portion 112. This engagement prevents slidable movement of the channel structure 114 in the slot of the base portion 112. When it is desired to reposition the channel structure 114, so as to provide a more optimal position for the shoulder belt of the motor vehicle seat belt 30 relative to the child, the channel structure 114 can be forced by an operator toward the seat back 24 and against the bias of the springs 116 so as to release the serrations 132 from engagement with the serrations 124. When in this position, the channel structure 114 can be slid in the slot 118 to a new position relative to the base portion 112 so as to more optimally position the shoulder belt of the motor vehicle seat belt 30. In a similar fashion to the first embodiment of the shoulder belt guide 90, the second embodiment of the shoulder belt guide 110 is provided on each side of the child restraint system 20 to allow the child restraint system 20 to be used on either side of the motor vehicle.

Figure 19:
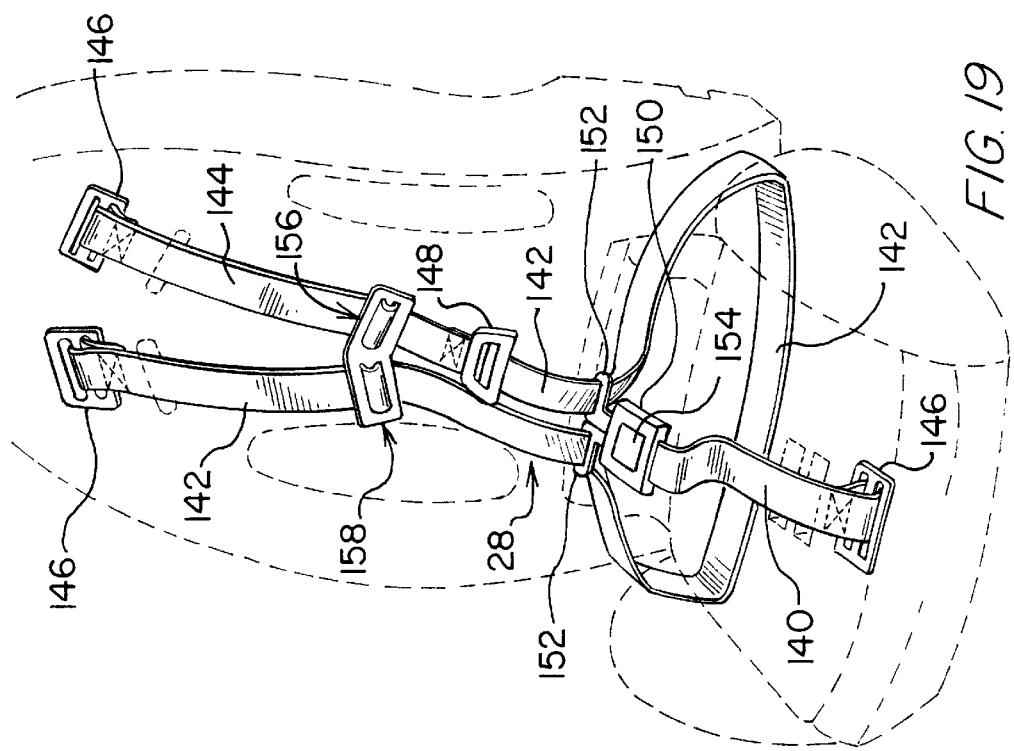
FIG. 19 is a perspective view of the child restraint system of the present invention showing a child restraint belt system provided therein, with the seat back and seat bottom shown in phantom.

The child restraint belt system 28, shown in FIGS. 13, 14, and 19, includes three belt portions, a crotch belt 140, a main belt 142, and a shoulder belt 144. Each of the belt portions 140, 142, and 144 have a belt slide 146 attached at one end thereof by threading the belt through the belt slide 146, folding the belt back, and stitching it to itself. Each belt slide 146 is rectangular and includes a cross piece therein which the belt is looped around. Each belt slide 146 can be turned on end and inserted through one of the belt grommets 82 and shoulder belt openings 54 and turned around to be retained on the back side of the seat back 24 adjacent the opening 54 by the belt. One end of the shoulder belt 144 is inserted through an opening 54, and one end of main belt 142 is inserted through the corresponding opening 54, for a desired height of the belt system 28 on the seat back 24. The end of the crotch belt 140 is inserted through one of two similar openings in the seat bottom 22, either of which may be selected for optimal fit of the occupant.

The shoulder belt 144 terminates at an opposite end from its end with the belt slide 146 with a mid-belt adjuster 148, such as is available from Indiana Mills and Manufacturing, Inc., of Westfield, Ind. The mid-belt adjuster 148 receives the opposite end of the main belt 142 from the end of the main belt 142 with the belt slide 146. The mid-belt adjuster 148 is a device which allows the effective length of the main belt 142 to be adjusted.

Before the main belt 142 is attached to the shoulder belt 144 via the mid-belt adjuster 148, the main belt 142 connects first to the crotch belt 140 via a receptacle or buckle 150, then loops under the seat bottom 22 by passing through openings defined in the fabric cover 26 on either side of the child's hips or thighs, before returning to connect a second time to the crotch belt 140 and then terminate at the mid-belt adjuster 148. The crotch belt has the buckle 150 on an end thereof which is opposite from the belt slide 146. The buckle 150 receives two tongues 152 provided on the main belt 142 at spaced apart locations. The buckle 150 includes a release button 154 thereon which releases the tongues 152 from the buckle 150. Lastly, the shoulder belt 144 includes a slidable belt link 156 which is retained thereon and has an open sleeve 158 thereon to selectively be attached to the main belt 142 in the vicinity of the child's chest and hold the two belts 142 and 144 in an adjacent position.

As can be appreciated, adjustment of the mid-belt adjuster 148 has the effect of tightening or loosening all the belts 140, 142, and 144 in the system 28, due to the looped and interconnected nature thereof. In this manner, the entire system can be loosened or tightened to most appropriately fit the particular child occupying the child restraint system 20.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A child restraint system adapted for use in a motor vehicle, the motor vehicle having a sent therein and a seat belt system for restraining passengers therein, the motor vehicle seat belt system including a first engagement member associated with the motor vehicle seat and a continuous waist and shoulder belt associated with the motor vehicle seat onto which a second engagement member is slidably received so that when the first and second engagement members are engaged to each other, the second engagement member divides the continuous waist and shoulder belt into a waist belt portion and a shoulder belt portion, the child restraint system being adapted for boosting a child up from the motor vehicle seat, the child restraint system and the child being restrained in the motor vehicle sect by the motor vehicle seat belt system which passes over and around both the child restraint system and the child, the child restraint system comprising:

a seat platform adapted for resting on the motor vehicle seat;

a back platform attached to the seat platform, the back platform having ,ides and a top and a bottom thereon, the sides having upper and lower portions;

a belt guide attached to one side of the back platform in a position on an exterior of the child restraint system on the upper portion of the one side proximate to the top of the back platform and closer to the top than the bottom of the back platform, the belt guide defining at least three open adjacent, spaced-apart channels therein for removably receiving the shoulder belt portion of the continuous waist and shoulder belt in a selected one of the channels, the shoulder belt portion being slidable within the selected channel, the channels of the belt guide providing multiple spaced-apart locations for selectively positioning the shoulder belt portion in one of the multiple locations so that the shoulder belt portion can be positioned adjacent and resting on the front chest side of the child at a central point between the child's neck and the shoulder when the first and second engagement members of the motor vehicle seat belt system are engaged to each other.

2. A child restraint system as defined in claim 1, wherein the belt guide is fixedly attached to the side of the back platform, the belt guide including a plurality of fixed open channels defined therein.

3. A child restraint system as defined in claim 1, wherein each of the open channels includes a pair of opposed fingers that form a gap therebetween for threading the shoulder belt portion of the continuous waist and shoulder bell in and out of the channel.

4. A child restraint system as defined in claim 1, wherein each of the open channels is defined by rigid members.

5. A child restraint system adapted for use in a motor vehicle, the motor vehicle having a seat therein and a seat belt system for restraining passengers therein, the motor vehicle seat belt system including a shoulder belt, the child restraint system being adapted for boosting a child up from the motor vehicle seat, the child restraint system and the child being restrained in the motor vehicle seat by the motor vehicle seat belt system which passes over and around both the child restraint system and the child, the child restraint system comprising:

a seat platform adapted for resting on the motor vehicle seat;

a back platform attached to the seat platform, the back platform having sides thereon, the sides having upper and lower portions;

a belt guide attached to one side of the back platform in a position on an exterior of the child restraint system, the belt guide defining an open channel therein for removably receiving the motor vehicle shoulder belt, the motor vehicle shoulder belt being slidable within the channel, the belt guide providing multiple locations for positioning the motor vehicle shoulder belt so that the motor vehicle shoulder belt can be positioned adjacent and resting on the front chest side of the child at a central point between the child's neck and the shoulder;

wherein the belt guide is fixedly attached to the side of the back platform, the belt guide including a plurality of fixed open channels defined therein, and further wherein each fixed open channel includes a bottom, two side walls, and two portions of a top, each portion of the top being attached to opposite ones of the side walls to define a gap between the two top portions, wherein the shoulder belt is insertable into and removable from the belt guide transversely through the gap, the top portions serving to retain the shoulder belt in the belt guide after the shoulder belt is threaded through the gap.

6. A child restraint system for restraining a child, comprising:

a platform base providing structural support to the child restraint system, the platform base including a seat bottom and a seat back, the seat back having a central portion and two side portions, with the central portion and each of the two side portions defining an opening substantially larger than the largest cross-sectional dimension of a motor vehicle seat belt therebetween proximate to the position of the child's torso when the child is seated in the child restraint system; and a fabric cover disposed on top of the platform base and snugly fitted thereto, the fabric cover being suitable for sitting on by the child, the fabric cover including a seat bottom portion and a seat back portion, the seat back portion having a central portion and two side portions, with the central portion and each of the two side portions being separated by a mesh portion, the fabric cove being adapted so that when snugly fitted to the platform base, the sect bottom portion of the fabric cover corresponds to and fits to the seat bottom of the platform base and the seat back portion of the fabric cover corresponds to and fits to the seat back of the platform base, with the mesh portion on each side of the fabric cover being aligned with and corresponding to the opening defined between the central portion and the sides of the seat back of the platform base, to allow for the increased circulation of air to and from the vicinity surrounding the child's torso, the mesh portions each having an open texture with a plurality of evenly-spaced holes defined therein.

7. A child restraint system as defined in claim 6, wherein the opening covers a surface area greater than ten square inches.

8. A child restraint system for restraining a child, comprising:

a sect platform adapted for a child to sit thereon, the seat platform including a neck protruding from a backside thereof;

a back platform having an opening defined in a lower region thereof for slidably receiving the neck of the seat platform in the opening to engage the seat platform and the back platform together, the back platform being pivotably attached to the seat platform at a pivot point to allow the back platform to be positioned at one of a plurality of pivotable positions relative to the sect platform, the back platform being selectively attachable at a plurality of fixed positions to the seat platform by a locking member which is received within a cylindrical bore defined on one of the neck of the seat platform and the lower region of the back platform and which is selectively received within one of a plurality of spaced-apart cylindrical bores defined on the other of the neck of the seat platform and the lower region of the back platform, the plurality of cylindrical bores being located on an arcuate line, the plurality of cylindrical bores each having a diameter slightly larger than a diameter of the locking member to snugly and slidably receive the locking member.

9. A child restraint system as defined in claim 8, wherein the locking member is an elongated, cylindrical pin.

* * * * *